Dec. 9, 1924.
F. STREICH
1,518,418
DOUGH MIXER
Filed Sept. 4, 1923　　2 Sheets-Sheet 1
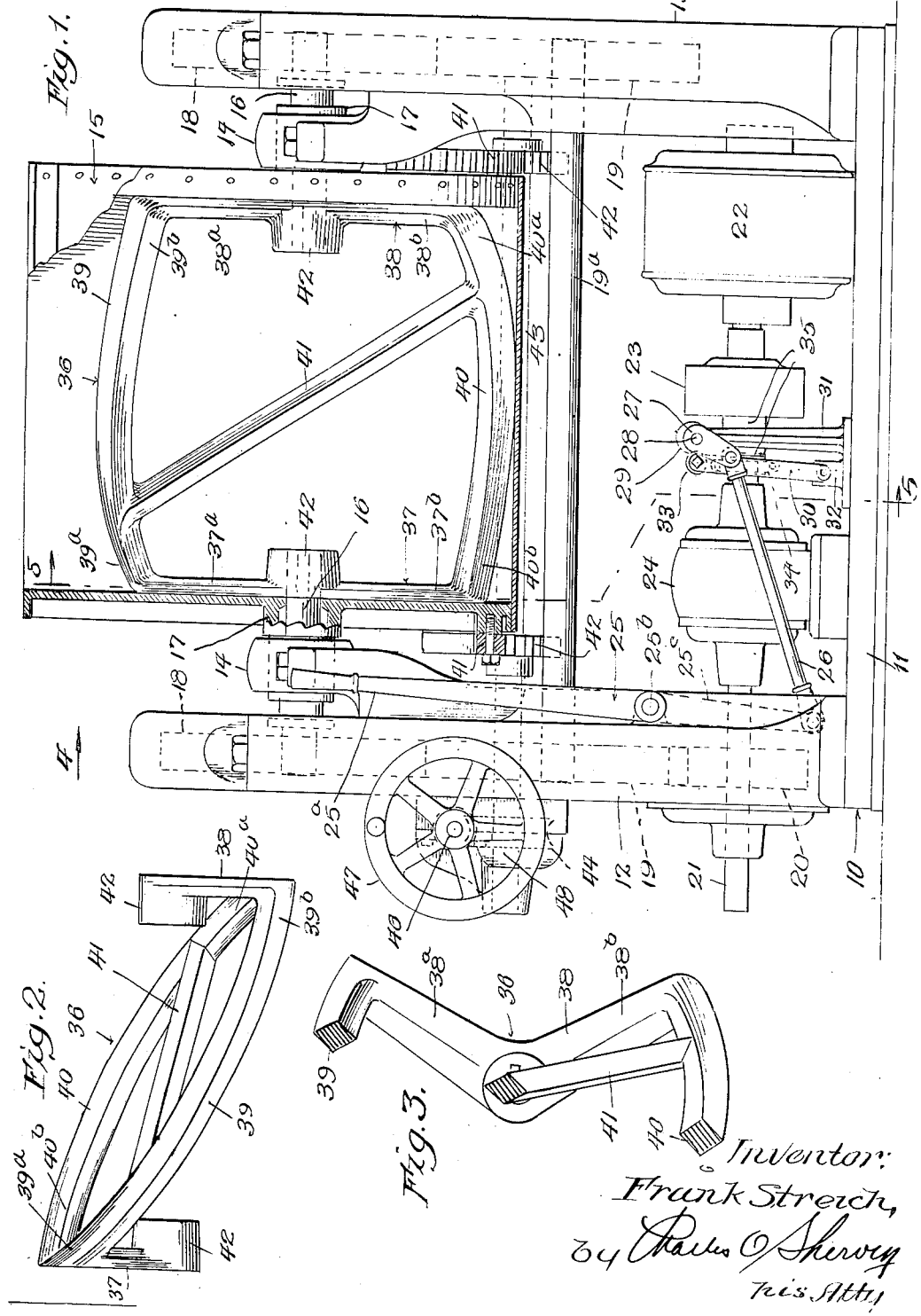
Inventor:
Frank Streich,
By Charles O. Shervey
his Atty.

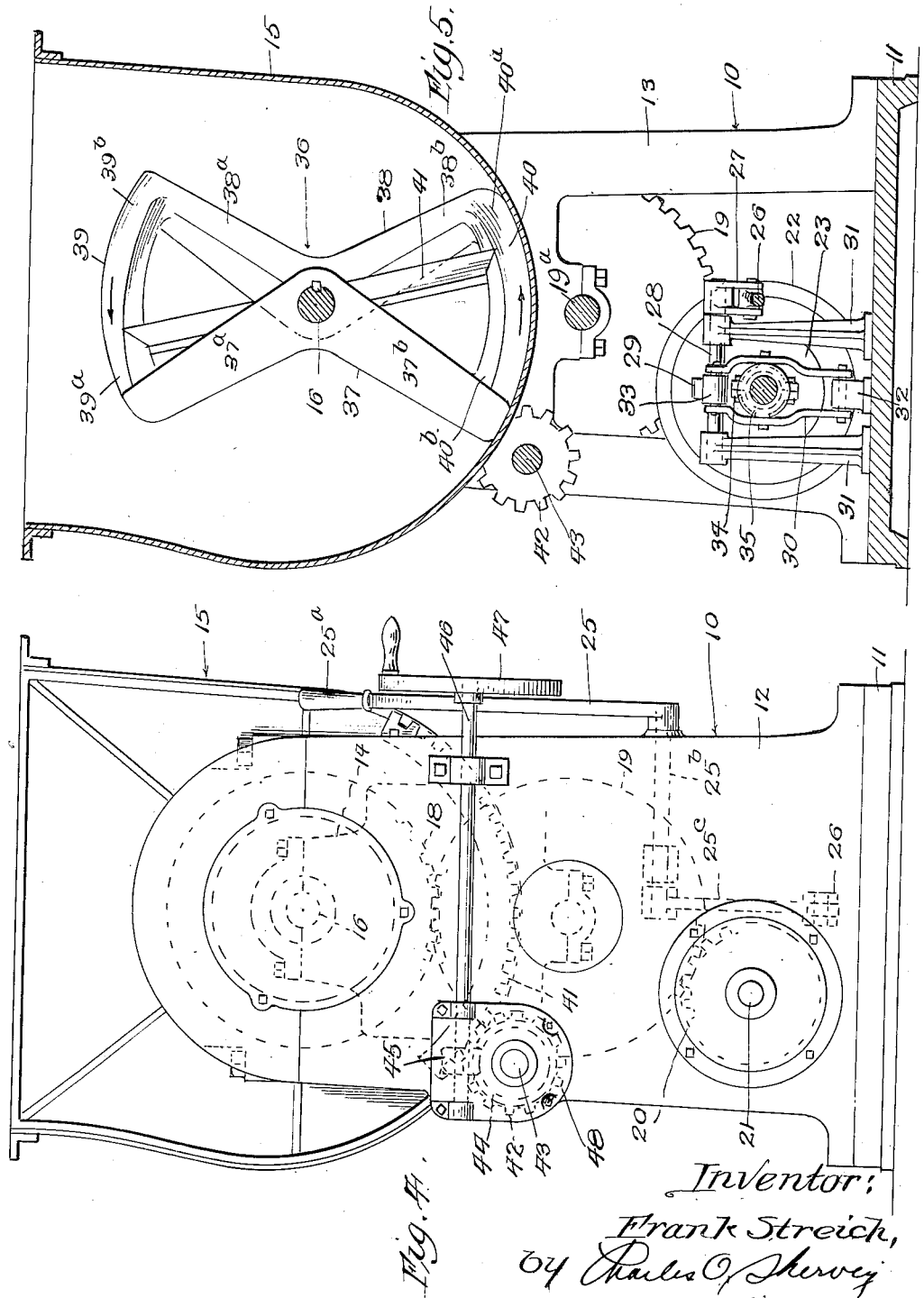

Patented Dec. 9, 1924.

1,518,418

UNITED STATES PATENT OFFICE.

FRANK STREICH, OF JOLIET, ILLINOIS, ASSIGNOR TO UNION MACHINERY COMPANY, OF JOLIET, ILLINOIS, A CORPORATION OF ILLINOIS.

DOUGH MIXER.

Application filed September 4, 1923. Serial No. 660,759.

*To all whom it may concern:*

Be it known that I, FRANK STREICH, a citizen of the United States, and a resident of Joliet, Will County, Illinois, have invented certain new and useful Improvements in Dough Mixers, of which the following is declared to be a full, clear, and exact description.

This invention relates to dough mixers and its principal object is to provide a mixer of improved construction and operation. Another object is to provide an improved agitator in a dough mixer, whereby a more thorough mixing of the dough is obtained. Another object is to provide a dough mixer capable of handling large and small batches of dough. Another object is to provide novel control mechanism for the driving means. With these and other objects and advantages in view, this invention consists in the several novel features hereinafter fully set forth and claimed.

The invention is clearly illustrated in the accompanying drawings, in which:

Fig. 1 is a front elevation, partly broken out, illustrating a simple form of the invention; Fig. 2 is a detail plan of the agitator; Fig. 3 is a detail vertical cross section thereof; Fig. 4 is an end view of the mixer, looking in the direction of the arrow 4 in Fig. 1, and Fig. 5 is a vertical cross-section of the mixer taken on line 5—5 of Fig. 1.

Referring to said drawings, which illustrate a simple embodiment of the invention, the reference character 10, designates the main frame, which comprises a base plate 11 and two hollow standards or end frame members 12, 13, bolted or otherwise rigidly secured to the base plate. The standards are made hollow to receive certain gearing, and are formed with companion bearing brackets 14, 14 in which the mixing bowl 15 is rotatively mounted, and the agitator driving shafts 16 are journaled. The bowl 15 is provided with hollow gudgeons 17 that bear in the bearing brackets 14, and the agitator shafts 16 extend through said gudgeons and into the mixing bowl. One end of each shaft 16 extends into the hollow of the adjacent standard, and has a gear wheel 18 mounted thereon, which gear wheel meshes with an idler gear wheel 19, both of which are mounted on a shaft 19$^a$ one of which has the gear wheel 19 mounted thereon that meshes with a gear 20 mounted on the main drive shaft 21.

The drive shaft 21 is driven by an electric motor 22, mounted on the base 11, and a clutch 23 and speed reducing gear mechanism 24 are introduced between the motor 22 and drive shaft 21. Clutch operating mechanism is provided for the clutch and, as shown, said mechanism comprises a control lever 25, a link 26 connected thereto, an arm 27 fast upon a rock shaft 28 and connected to the link 26, an eccentric block 29 on the rock shaft, and a clutch lever 30 with which said eccentric block engages. The rock shaft 28 is journaled in standards 31 mounted on the base plate, and the clutch lever is fulcrumed upon a bracket 32 mounted on the base plate. The clutch lever 30 has a roller 33 mounted on its upper end in position to be engaged by the eccentric block 29, and said lever has the usual clutch collar 34 connected to the movable sleeve 35 of the clutch. The clutch operating lever 25 comprises a handle portion 25$^a$ fast on a shaft 25$^b$ journaled in bearing apertures in the standard 12, and an arm 25$^c$ fast on said shaft 25$^b$ and connected to the link 26. By shifting the clutch operating lever 25 in the proper direction, the clutch is clutched and unclutched, thereby coupling and uncoupling the motor shaft with the shaft of the speed reducing gear mechanism 24.

The agitator 36 is of novel construction and comprises two companion V or substantially V-shaped arms 37, 38, connected by helical blades 39, 40, and a diagonal blade 41 which connect the blades 39, 40. The two parts of each arm 37, 38 extend in radial directions from a hub 42 keyed to an associated shaft 16, and the two parts 37$^a$, 37$^b$, 38$^a$, 38$^b$ of each arm diverge from the associated hub at a wide angle, although the part 37$^a$ of one arm, and part 38$^b$ of the other arm are diametrically opposite each other, and the parts 37$^b$, 38$^a$ of the arm are diametrically opposed to each other. The outer end of the arm 37$^a$ is connected to the outer end of the arm 38$^a$ by the helical blade 39, and the part 37$^b$ is connected to the part 38$^b$ by the other helical blade 40. In cross-section the blades 39, 40, and 41 are somewhat diamond shaped as shown.

It will be observed that the blade 39 curves forward from the arm 37, and the blade 40 curves backward from the arm 38, as viewed in Figs. 1 and 2. The result is that during rotation of the agitator upon its axis, the end 39$^a$ precedes the end 39$^b$ of the blade 39 in its movement through the dough, and the end 40$^a$ of the blade 40 precedes the end 40$^b$ during its movement through the dough. As a consequence, the dough is forced toward one end of the bowl by one blade, and forced toward the other end of the bowl by the other blade, the diagonal blade cutting through the dough in its movement. By this arrangement a more thorough mixing of the dough is obtained in less time than is ordinarily required and large or small batches of dough may be efficiently handled.

Means are provided for tilting the bowl to discharge its contents, and as shown, said means comprises gear segments 41 on the bowl, pinions 42 that mesh with said gear segments, a shaft 43 upon which said pinions are mounted, a worm gear 44 on one end of said shaft 43, and a worm pinion 45 meshing with said worm gear and fast on a shaft 46 which extends to the front of the machine and has a hand wheel 47 thereon by which the parts are turned. The worm gear and pinion are enclosed in a housing 48 and the shafts are journaled in suitable bearing boxes mounted on the standards.

In operation the clutch is thrown in by shifting the lever 25 in the proper direction. The agitator is thereby rotated in the direction of the arrows thereon (see Fig. 5), and the dough is mixed and kneaded by the blades as they pass down and up through and with the mass. When finished the clutch is unclutched and the hand wheel 47 turned in the proper direction, thereby tilting the bowl and discharging the contents.

More or less variation of the exact details of construction is possible without departing from the spirit of this invention; I desire, therefore, not to limit myself to the exact form of the construction shown and described, but intend, in the following claim, to point out all of the invention described herein.

I claim as new and desire to secure by Letters Patent:—

In a dough mixer, the combination with a mixing bowl having a curved bottom, of an agitator comprising two spaced arms mounted on separate shafts, two helical mixing blades connecting said arms and forming the sole connection therebetween, and a diagonal mixing blade extending between and connecting said helical mixing blades, and said helical mixing blades contacting with the curved bottom of said mixing bowl during a portion of their rotary movement therein.

FRANK STREICH.